(12) United States Patent
Zhang et al.

(10) Patent No.: US 11,216,925 B2
(45) Date of Patent: Jan. 4, 2022

(54) IMAGE PROCESSING METHOD, IMAGE PROCESSING SYSTEM, AND STORAGE MEDIUM

(71) Applicant: BOE TECHNOLOGY GROUP CO., LTD., Beijing (CN)

(72) Inventors: Shunhang Zhang, Beijing (CN); Quan Yang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 51 days.

(21) Appl. No.: 16/618,873

(22) PCT Filed: Apr. 22, 2019

(86) PCT No.: PCT/CN2019/083691
§ 371 (c)(1),
(2) Date: Dec. 3, 2019

(87) PCT Pub. No.: WO2019/206082
PCT Pub. Date: Oct. 31, 2019

(65) Prior Publication Data
US 2020/0134795 A1 Apr. 30, 2020

(30) Foreign Application Priority Data

Apr. 27, 2018 (CN) .......................... 201810392273.3

(51) Int. Cl.
*G06T 5/00* (2006.01)
*G06T 5/30* (2006.01)
(Continued)

(52) U.S. Cl.
CPC ............ *G06T 5/30* (2013.01); *G06F 12/0875* (2013.01); *G06T 1/0007* (2013.01); *G06T 5/002* (2013.01)

(58) Field of Classification Search
CPC ........... G06T 5/30; G06T 5/002; G06T 5/009; G06T 5/008; G06T 1/0007; G06T 1/60;
(Continued)

(56) References Cited

U.S. PATENT DOCUMENTS 6,072,907 A * 6/2000 Taylor ...................... G06K 9/38
358/1.9
8,115,833 B2 * 2/2012 Aragaki ................ H04N 5/217
348/241
(Continued)

FOREIGN PATENT DOCUMENTS

CN 102693429 A 9/2012
CN 104301584 A 1/2015
(Continued)

OTHER PUBLICATIONS

Design and Implementation of Image Acquisition System based on FPGA, Yangyuchao, dated on Jan. 15, 2015.
(Continued)

*Primary Examiner* — Jose L Couso
(74) *Attorney, Agent, or Firm* — Dilworth & Barrese, LLP.; Michael J. Musella, Esq.

(57) ABSTRACT

An image processing method, an image processing system and a storage medium are provided. The image processing method includes: acquiring an initial image; extracting a contour of a predetermined target included in the initial image during a transmission process of pixel data of the initial image; and obtaining information of the predetermined target according to the contour of the predetermined target included in the initial image.

19 Claims, 7 Drawing Sheets

(51) Int. Cl.
*G06F 12/0875* (2016.01)
*G06T 1/00* (2006.01)

(58) Field of Classification Search
CPC ........... G06T 7/136; G06T 7/187; G06T 7/13;
G06T 7/11; G06T 7/269; G06T 7/194;
G06T 7/44; G06T 7/62; G06T 7/70;
G06T 7/77; G06T 2207/20024; G06T
2207/10016; G06T 2207/20021; G06T
2207/20028; G06T 2207/20132; G06T
2207/10008; G06T 2207/20012; G06T
2207/30176; G06T 2219/2012; G06F
12/0875; G06F 3/013; H04N 5/232;
H04N 5/23229; H04N 5/57; H04N 5/202;
H04N 9/68; H04N 9/643; H04N 9/69;
H04N 13/133; H04N 1/3935; H04N
1/407; H04N 1/58; H04N 1/6027; H04N
1/40012; H04N 1/4052; H04N 1/409;
G06K 9/3241; G06K 9/4642; G06K
9/00604; G06K 9/38; G06K 2209/21;
G06K 2209/01; G06K 15/128; G06K
2215/0057; G09G 2320/066; G09G
2320/0673; G09G 2320/0285; G09G
2320/02; G09G 2320/0242; G09G
2320/0271; G09G 3/003; G09G 5/04;
G09G 5/06; G09G 5/10
See application file for complete search history.

(56) References Cited

U.S. PATENT DOCUMENTS

| | | | | |
|---|---|---|---|---|
| 8,290,253 | B1* | 10/2012 | Wang | ...................... G06T 7/149 |
| | | | | 382/162 |
| 9,208,403 | B1* | 12/2015 | Aviv | .......................... G06T 7/13 |
| 9,584,719 | B2 | 2/2017 | Bishop et al. | |
| 2005/0226526 | A1* | 10/2005 | Mitsunaga | ............... H04N 9/68 |
| | | | | 382/274 |
| 2007/0080975 | A1* | 4/2007 | Yamashita | ............... H04N 9/68 |
| | | | | 345/591 |
| 2008/0316328 | A1* | 12/2008 | Steinberg | ............... H04N 5/222 |
| | | | | 348/222.1 |
| 2009/0207285 | A1* | 8/2009 | Sambongi | ............... G06T 5/009 |
| | | | | 348/254 |
| 2010/0201820 | A1* | 8/2010 | Lopota | .................... G06T 7/254 |
| | | | | 348/152 |
| 2014/0002746 | A1* | 1/2014 | Bai | .......................... G06T 7/11 |
| | | | | 348/607 |
| 2015/0019816 | A1* | 1/2015 | Akirav | ................ G06F 12/0848 |
| | | | | 711/129 |
| 2015/0019817 | A1* | 1/2015 | Akirav | .................. G06F 3/0641 |
| | | | | 711/129 |
| 2015/0085150 | A1* | 3/2015 | Silverstein | ......... H04N 5/23248 |
| | | | | 348/208.6 |
| 2015/0092982 | A1 | 4/2015 | Kang et al. | |
| 2016/0267346 | A1* | 9/2016 | Jain | .......................... G06T 7/194 |
| 2018/0075795 | A1* | 3/2018 | Lin | .......................... G09G 3/36 |
| 2018/0288356 | A1* | 10/2018 | Ray | ..................... H04N 19/124 |
| 2018/0293757 | A1* | 10/2018 | Kambhatla | .......... H04N 19/115 |
| 2018/0300839 | A1* | 10/2018 | Appu | .................... H04N 19/156 |
| 2018/0308257 | A1* | 10/2018 | Boyce | ....................... G06T 1/60 |
| 2018/0309927 | A1* | 10/2018 | Tanner | ............. H04N 21/42202 |
| 2019/0147605 | A1 | 5/2019 | Wang et al. | |
| 2019/0285980 | A1* | 9/2019 | Yoshikawa | ...... G01N 21/95607 |
| 2020/0233493 | A1* | 7/2020 | Bott | .................... G06K 9/00744 |

FOREIGN PATENT DOCUMENTS

| | | |
|---|---|---|
| CN | 105184216 A | 12/2015 |
| CN | 105678792 A | 6/2016 |
| CN | 106377264 A | 2/2017 |
| CN | 106666903 A | 5/2017 |
| CN | 106717000 A | 5/2017 |
| CN | 107025639 A | 8/2017 |
| CN | 107292948 A | 10/2017 |
| CN | 107808397 A | 3/2018 |

OTHER PUBLICATIONS

First Chinese Office Action in priority Chinese Patent Application No. 201810392273.3 dated Aug. 11, 2020.
Biao "Research and Hardware Implementation of the Sub-pixel Image Contour Extraction Algorithm" Thesis, Apr. 2008, Changsha, Hunan, China.
Dongmei Yang et al. "Study on Obtaining Anthropometric Data Based on Binocular vision", Jun. 7, 2014.

\* cited by examiner

|   |   |   |
|---|---|---|
| 1 | 2 | 1 |
| 2 | 4 | 2 |
| 1 | 2 | 1 |
FIG. 6
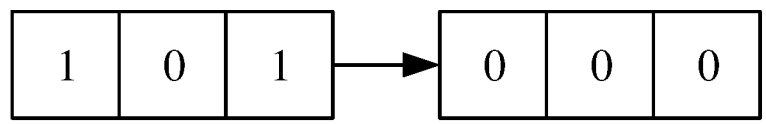
FIG. 7
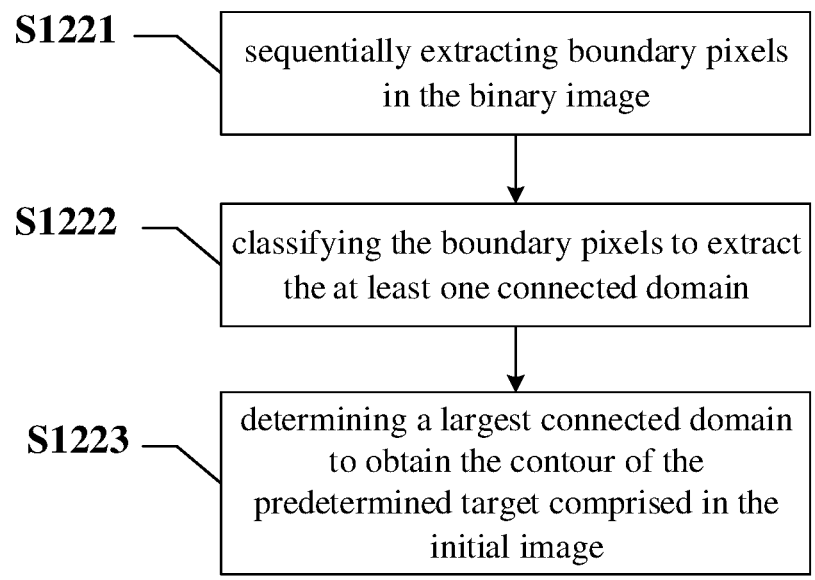
FIG. 8

| | 1 | |
|---|---|---|
| 3 | now1 | 4 |
| | 2 | |

| 8 | 7 | 6 |
|---|---|---|
| 1 | now2 | 5 |
| 2 | 3 | 4 |

IMAGE PROCESSING METHOD, IMAGE PROCESSING SYSTEM, AND STORAGE MEDIUM

The application claims priority to the Chinese patent application No. 201810392273.3, filed on Apr. 27, 2018, the entire disclosure of which is incorporated herein by reference as part of the present application.

TECHNICAL FIELD

At least one embodiment of the present disclosure relates to an image processing method, an image processing system, and a storage medium.

BACKGROUND

With the development of society and the progress of technologies, smart home has gradually entered life of the public. For example, in the development of smart home, the appearance of smart fitting mirror enables customers to know an effect of wearing clothes without actually trying on clothes, and thus the customers can obtain a better fitting experience.

SUMMARY

At least one embodiment of the present disclosure provides an image processing method comprising: acquiring an initial image; extracting a contour of a predetermined target comprised in the initial image during a transmission process of pixel data of the initial image; and obtaining information of the predetermined target according to the contour of the predetermined target comprised in the initial image.

For example, in the image processing method provided by at least one embodiment of the present disclosure, extracting the contour of the predetermined target comprised in the initial image comprises: sequentially performing an image preprocessing operation on the pixel data of the initial image acquired in the transmission process to sequentially obtain binary pixel data of a binary image corresponding to the initial image; and extracting at least one connected domain in the binary image based on the binary pixel data, which has been obtained, to determine the contour of the predetermined target comprised in the initial image.

For example, in the image processing method provided by at least one embodiment of the present disclosure, the image preprocessing operation comprises: sequentially performing a grayscale conversion operation on the pixel data of the initial image to obtain grayscale values of the pixel data of the initial image; and comparing the grayscale values of the pixel data with a threshold parameter, and in a case where a grayscale value of one of the pixel data is greater than the threshold parameter, a grayscale value of a corresponding binary pixel data is zero, and in a case where a grayscale value of one of the pixel data is less than or equal to the threshold parameter, a grayscale value of a corresponding binary pixel data is one.

For example, in the image processing method provided by at least one embodiment of the present disclosure, the image preprocessing operation further comprises: performing a contrast enhancement operation on the grayscale values of the pixel data of the initial image.

For example, in the image processing method provided by at least one embodiment of the present disclosure, the image preprocessing operation further comprises: sequentially performing a cache operation on the grayscale values of the pixel data of the initial image, or sequentially performing a cache operation on the grayscale values of the pixel data subjected to the contrast enhancement operation; and performing a Gaussian filtering operation on a plurality of rows of grayscale values that are cached.

For example, in the image processing method provided by at least one embodiment of the present disclosure, the threshold parameter is acquired by a fixed threshold method or a dynamic threshold method.

For example, in the image processing method provided by at least one embodiment of the present disclosure, the image preprocessing operation further comprises: performing a boundary erosion operation and/or a dilation operation on the pixel data of the binary image.

For example, in the image processing method provided by at least one embodiment of the present disclosure, extracting at least one connected domain in the binary image based on the obtained binary pixel data to determine the contour of the predetermined target comprised in the initial image comprises: sequentially extracting boundary pixels in the binary image; classifying the boundary pixels to extract the at least one connected domain; and determining a largest connected domain according to the at least one connected domain to obtain the contour of the predetermined target comprised in the initial image.

For example, in the image processing method provided by at least one embodiment of the present disclosure, sequentially extracting the boundary pixels in the binary image comprises: sequentially performing a cache operation on the binary pixel data of the binary image; and extracting the boundary pixels in a plurality of rows of binary pixel data which are cached, by a four-neighborhood method, and caching the boundary pixels, which is extracted.

For example, in the image processing method provided by at least one embodiment of the present disclosure, sequentially extracting the boundary pixels in the binary image further comprises: performing a calculation of the four-neighborhood method on the plurality of rows of binary pixel data that are cached, by a ping-pong operation.

For example, in the image processing method provided by at least one embodiment of the present disclosure, classifying the boundary pixels to extract the at least one connected domain comprises: classifying the boundary pixels to extract the at least one connected domain by an eight-neighborhood method.

For example, in the image processing method provided by at least one embodiment of the present disclosure, determining the largest connected domain according to the at least one connected domain to obtain the contour of the predetermined target comprised in the initial image comprises: determining the connected domain with a largest number of coordinates of the boundary pixels as the largest connected domain, wherein the largest connected domain is the contour of the predetermined target comprised in the initial image.

For example, in the image processing method provided by at least one embodiment of the present disclosure, obtaining the information of the predetermined target according to the contour of the predetermined target comprised in the initial image comprises: extracting coordinates of the contour of the predetermined target comprised in the initial image and storing the coordinates; and calculating the coordinates of the contour of the predetermined target to obtain the information of the predetermined target.

For example, the image processing method provided by at least one embodiment of the present disclosure, further comprises: before the initial image is acquired, acquiring an intercept parameter of an intercept region, and only acquiring a portion of the initial image corresponding to the intercept region from an image capture device based on the intercept parameter, so as to process the portion of the initial image.

For example, in the image processing method provided by at least one embodiment of the present disclosure, the intercept parameter comprises data, which is to be retained upon counting based on a field synchronization control signal and/or a clock signal of the image capture device, of the initial image.

For example, in the image processing method provided by at least one embodiment of the present disclosure, the predetermined target is a human body.

For example, in the image processing method provided by at least one embodiment of the present disclosure, classifying the boundary pixels to extract the at least one connected domain and obtaining the information of the predetermined target according to the contour of the predetermined target included in the initial image are performed in a blanking phase of a frame.

At least one embodiment of the present disclosure further provides an image processing system comprising: a processor, a storage, and one or more computer program modules stored in the storage and configured to be executed by the processor; and the one or more computer program modules comprise instructions for executing the image processing method provided by any one of the embodiments of the present disclosure.

For example, the image processing system provided by at least one embodiment of the present disclosure further comprises an image capture device configured to acquire the initial image.

At least one embodiment of the present disclosure further provides a storage medium, non-temporarily storing computer readable instructions; in a case where the computer readable instructions, which is stored non-temporarily, are executed by a computer, the storage medium performs the image processing method provided by any one of the embodiments of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 6 is a schematic diagram of Gaussian filtering operation in the image processing method provided by an embodiment of the present disclosure;

FIG. 7 is a schematic diagram of performing an erosion operation on a boundary in the image processing method provided by an embodiment of the present disclosure;

FIG. 8 is a flowchart of an example of step S122 in the image processing method illustrated in FIG. 4;

DETAILED DESCRIPTION

Figure 1A:
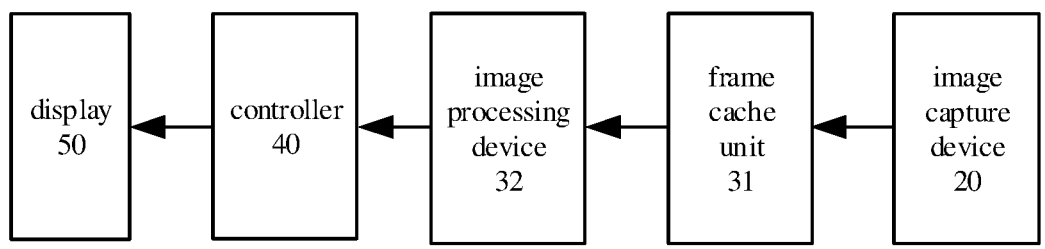
FIG. 1A is a schematic diagram of an image processing process provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

In the following, various embodiments according to the present disclosure are described in detail with reference to accompanying figures. It should be noted that in the figures, a same reference numeral represents components with a substantially same or similar structure and function, and repeated descriptions thereof are omitted.

FIG. 1A shows a schematic diagram of a smart fitting mirror in a case of performing an image processing operation. As illustrated in FIG. 1A, in an image processing system, an image capture device 20 captures an image including a human body, and caches a captured image frame (one frame image) into a frame cache unit 31 for subsequent processing of the cached image frame. For example, the frame cache unit 31 may cache a frame of image using an external storage (for example, Double Data Rate (DDR)) or an internal storage (for example, Random Access Storage (RAM)). For example, the frame cache unit 31 transmits the image frame, which is cached, to an image processing device 32, and the image processing device 32 processes the image frame, which is cached, for example, calculates various parameters, such as height, waist circumference or chest circumference, etc., of the human body included in the image, and then the image processing device 32 transmits the calculated above-mentioned parameters to a controller 40, so that the controller 40 can acquire corresponding pictures and other information according to these parameters, for example, the pictures and other information can be pictures of dresses, clothes, shoes, hats, decorations, and the like, which are matched according to the parameters of the human body of a customer, and the controller 40 controls a display 50 to display clothes matching the size or a style of the customer, and to display the clothes on the customer in the smart fitting mirror, so that the customer can know an effect after wearing the cloths without actually trying on the clothes, thereby enabling the customer to obtain a better fitting experience.

Figure 1B:
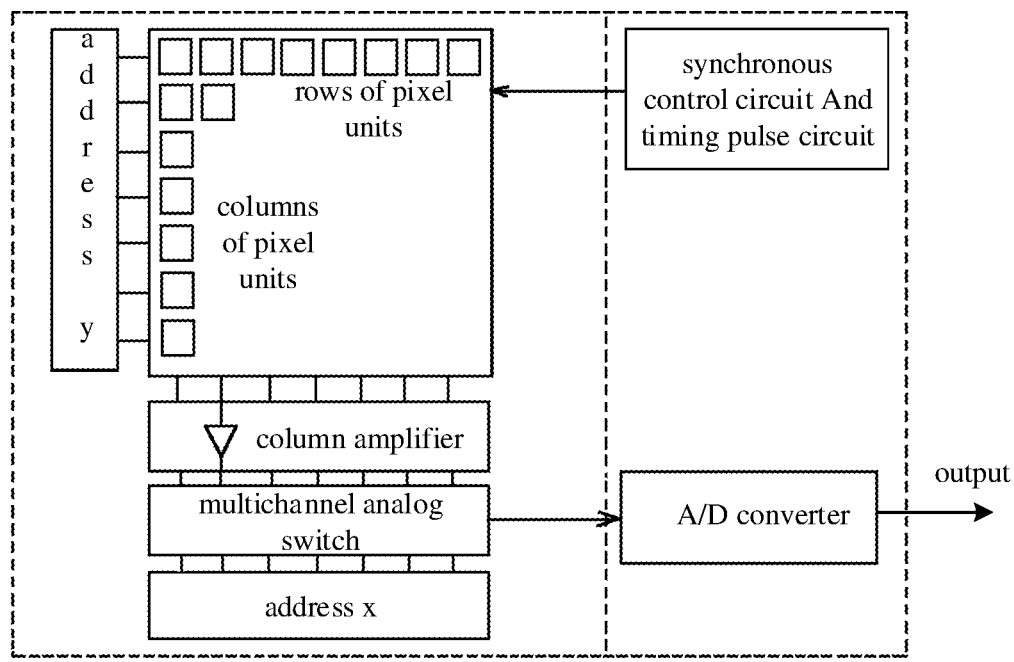
FIG. 1B is a schematic diagram of an example of an image capture device provided by an embodiment of the present disclosure.

FIG. 1B shows a schematic diagram of an example of the image capture device 20 as shown in FIG. 1A. As illustrated in FIG. 1B, the image capture device 20 includes a pixel unit array (comprising a plurality of rows of pixel units, a plurality of columns of pixel units) and a peripheral circuit, which may be integrated on a same silicon-based chip, for example. The pixel unit array includes pixel units arranged in an array, for example, as illustrated in FIG. 1B, the pixel unit array is arranged in a square matrix in a direction X and a direction Y, each pixel unit in the square matrix has a corresponding address in the direction X and the direction Y (for example, a row direction and a column direction), and can be selected respectively by address decoders of corresponding row lines and corresponding column lines in the two directions; after an output current/voltage signal is amplified, the output current/voltage signal, which is amplified, is sent to an A/D converter, which performs an analog-to-digital conversion on the output current/voltage signal, which is amplified, to obtain a digital signal, and then the digital signal is output. A synchronization control circuit of the image capture device 20 and a timing pulse circuit of the image capture device 20 control the pixel unit array to output the digital signals of the pixel units row by row. For example, the digital signals are supplied to the frame cache unit 31 illustrated in FIG. 1A, and after the digital signals of the entire pixel unit array are output and cached, a complete frame of image, that is, a cached image frame, is obtained.

In the above image processing process, on one hand, when storing a plurality of frames of images, for example, 16 frames of images are stored, for example, a resolution of each of the plurality of frames of images is 640*480, then a storage amount of the frame cache unit 31 is at least 640*480*16 bytes, which occupies considerable storage resources. Because an amount of the storage resources is proportional to a cost of the integrated circuit, a large amount of storage resources consumes a higher cost; and on the other hand, because during a period that an image data captured by the image capture device 20, such as a camera, is transmitted to the display, the image data captured by the image capture device 20 needs to be cached for image processing, there is a delay of one frame of image during display process of the display, thus affecting the viewing effect and use experience of the user.

At least one embodiment of the present disclosure provides an image processing method. The image processing method comprises: acquiring an initial image; extracting a contour of a predetermined target comprised in the initial image during a transmission process of pixel data of the initial image; and obtaining information of the predetermined target according to the contour of the predetermined target comprised in the initial image. At least one embodiment of the present disclosure further provides an image processing system and a storage medium which are corresponding to the above image processing method.

The image processing method can process an acquired video or image in real time without frame cache, which can reduce an operation power consumption and a manufacturing cost of a device, improve a response speed of the device, and enable the customer to get a better use experience.

Embodiments of the present disclosure are described in detail below with reference to accompanying figures.

Figure 2:
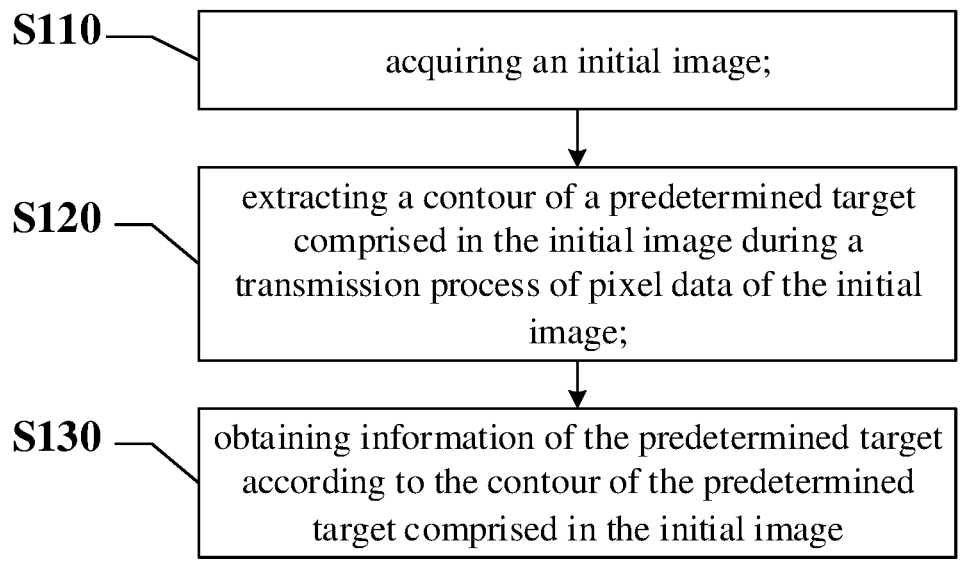
FIG. 2 is a flowchart of an image processing method provided by an embodiment of the present disclosure.

At least one embodiment of the present disclosure provides an image processing method. For example, the image processing method can be applied to a smart fitting mirror to detect a human body, as illustrated in FIG. 2. The image processing method includes steps S110 to S130. Next, the image processing method provided by the embodiment of the present disclosure is described with reference to FIG. 2.

Step S110: acquiring an initial image.

For example, the initial image may be obtained by an image capture device. For example, the image capture device may include a CMOS (complementary metal oxide semiconductor) sensor, a CCD (charge coupled device) sensor, and the like.

For example, before the initial image is acquired, an intercept parameter of an intercept region is acquired, and based on the intercept parameter, only a portion of the initial image corresponding to the intercept region is acquired from the image capture device; and then the portion of the initial image is processed. Therefore, in subsequent steps, only the pixel data of the image corresponding to the intercept region needs to be transmitted, so that a processing amount of data is reduced, the operation power consumption of the device is reduced, and the response speed of the device is improved. For example, the intercept region is a region of interest to people, when used for detecting a human body in the smart fitting mirror, the intercept region is a region where the human body is located. Accordingly, the intercept parameter can be set according to use experiences.

Figure 3:
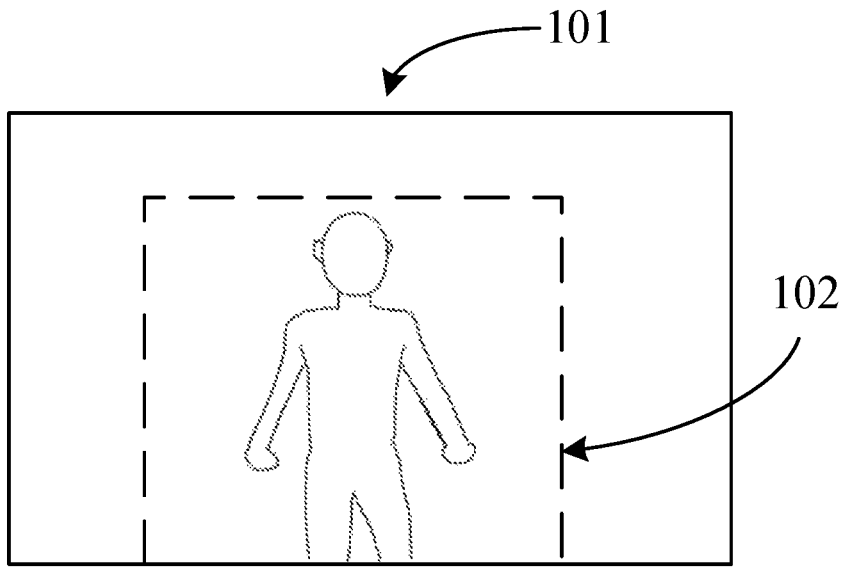
FIG. 3 is a schematic diagram of an intercept region in an image processing method provided by an embodiment of the present disclosure.

For example, the intercept parameter comprise data, which is to be retained upon counting based on a field synchronization control signal and/or a clock signal of the image capture device, of a portion of the initial image. For example, a region of a frame of entire image captured by the image capture device is a region 101 illustrated in FIG. 3, for example, a resolution of the region 101 is 640*480(640 columns and 480 rows). For example, an intercept region 102 illustrated in FIG. 3 is a region where an image of the human body is located. For example, the intercept region 102 includes a plurality of rows, and each row includes one row of pixel data. For example, the intercept region (that is, the region where the image of the human body is normally located) corresponds to a region including 480 columns and 320 rows (that is, 480*320) in a middle and lower part of the entire image frame, and the remaining region other than the intercept region, is an unnecessary background region. Therefore, in a case where data of the captured image frame are received from the image capture device, it is assumed that the pixel unit array (see FIG. 1B) is scanned row by row from top to bottom to read the data, and the data of first 160 rows of pixel units are skipped and not read (that is, the image is intercepted), but are read from a 161st row of pixel units, and only 480 columns of pixel units in the middle are read for each row, so correspondingly in the example of this embodiment, the intercept parameter are information of the rows and columns where the intercept region (for example, the region where the image of the human body is located) is located. Because each row and each column in the image respectively correspond to corresponding field synchronization control signals and clock signals, the intercept parameter can also be data, such as serial numbers and numbers, of the portion of the initial image captured by the image capture device that needs to be retained and is corresponding to the field synchronization control signals and clock signals. It should be noted that a position and a size of the intercept region (that is, the region where the image of the human body is usually located) depend on specific situations, and no limitation is imposed to this case in the embodiments of the present disclosure.

For example, the image capture device transmits the pixel data (for example, a count of rows, a count of columns, etc.) of the captured initial image to a controller such as a Field-Programmable Gate Array (FPGA) in real time. For example, the controller may be a controller separately provided or customized for achieving the image processing method of the embodiment of the present disclosure, and is different from the controller 40 of the system illustrated in FIG. 1A, or may be implemented by using the controller 40 again. According to the above-mentioned intercept parameter (that is, the region where the image of the human body is located is 480*320), the controller removes the pixel data that are not within the range of the intercept parameter by counting the field synchronization control signals (including a horizontal synchronization control signal HSYNC and a vertical synchronization control signal VSYNC) output by the synchronization control circuit of the image capture device illustrated in FIG. 1B, and thereby only retaining and transmitting the pixel data in the intercept region (that is, the region where the image of the human body is located) in the initial image, so that the processing amount of data is reduced and the response speed of the device is improved. For example, clock signals output by a timing pulse circuit of the image capture device illustrated in FIG. 1B are counted at the same time.

Step S120: extracting a contour of a predetermined target comprised in the initial image during a transmission process of pixel data of the initial image.

For example, the initial image is an image corresponding to the portion of the initial image corresponding to the intercept region described in step S110. For example, a largest connected domain in the initial image may serve as the contour of the predetermined target comprised in the initial image. For example, an extraction method of the largest connected domain is described in detail below and is not described here. For example, the contour of the predetermined target is used to determine relevant information of the predetermined target.

For example, the predetermined target includes the human body, and the embodiment of the present disclosure is described by taking human body detection as an example, and the following embodiment is the same as this case and will not described again. It should be noted that the predetermined target may be determined according to specific application situations, and no limitation is imposed to the embodiments of the present disclosure.

This step S120 and subsequent steps are achieved in a process of transmitting the pixel data of the initial image one by one or row by row, thus realizing real-time processing of the pixel data of the initial image and avoiding frame cache. For example, the transmission process of the pixel data of the initial image is a transmission process from the image capture device to a back-terminal controller, and in this transmission process, for example, processing such as extraction of the pixel data may be performed. The embodiment of the present disclosure includes but is not limited to this case. In the image processing method provided by the embodiment of the present disclosure, after the pixel data of the initial image are obtained, the pixel data of the initial image can be transmitted to any required device or module. For example, in the above transmission process, other steps such as the above-mentioned step S120 and the following steps are performed on the pixel data of the initial image, so that no frame cache operation is required, thus the captured video or image can be processed in real time, the operation power consumption and manufacturing cost of the device can be reduced, and the response speed of the device can be improved.

Step S130: obtaining information of the predetermined target according to the contour of the predetermined target comprised in the initial image.

For example, according to the contour of a predetermined target comprised in the initial image extracted in step S120, relevant information of the predetermined target is determined. For example, in a case where the predetermined target is a human body, the relevant information of the predetermined target includes various information such as the height, the waist circumference or the chest circumference of the human body. For example, in a case where the image processing method is applied to a smart fitting mirror, various information of the human body (that is, the customer) can be uploaded to a controller of the system, such as a central processing unit (CPU), so that the controller can control the display to display clothes suitable for the size and style of the customer according to the height, the waist circumference or the chest circumference of the human body to realize smart fitting, thereby enabling the customer to obtain a better fitting experience.

It should be noted that each step in each embodiment of the present disclosure can be implemented by the central processing unit (CPU) or other form of processing unit with a data processing capability and/or instruction execution capability. For example, the processing unit may be a general-purpose processor or a special-purpose processor, can be a processor based on X86 or ARM architecture, etc. The following embodiments are the same as the above and are not described again.

The image processing method provided by the embodiments of the disclosure can process the acquired video or image in real time without frame cache, thereby reducing the operation power consumption and the manufacturing cost of the device, improving the response speed of the device, and enabling customers to obtain better use experiences.

Figure 4:
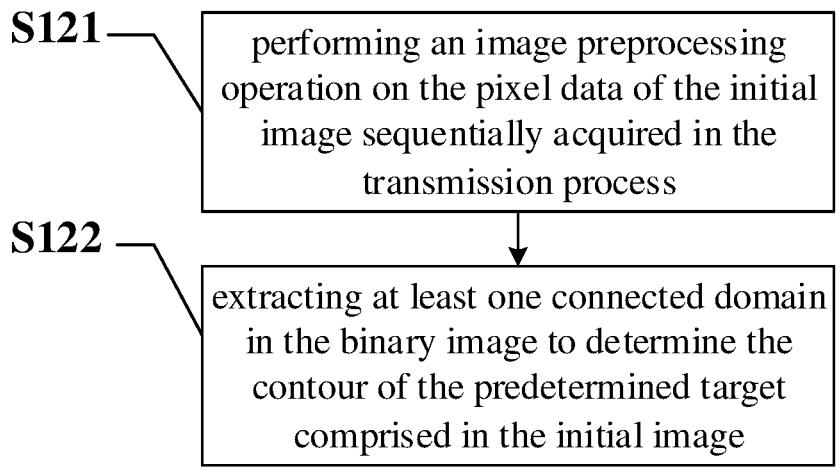
FIG. 4 is a flowchart of an example of step S120 in the image processing method illustrated in FIG. 2.

FIG. 4 is a flowchart of an extraction method of the contour of the predetermined target comprised in the initial image provided by an example of an embodiment of the present disclosure, that is, FIG. 4 is an operation flowchart of an example of step S120 illustrated in FIG. 2. As illustrated in FIG. 4, the extraction method includes step S121 and step S122. In the following, an image processing method according to an embodiment of the present disclosure is described with reference to FIG. 4.

Step S121: performing an image preprocessing operation on the pixel data of the initial image sequentially acquired in the transmission process.

For example, the term "sequentially acquired" means acquisition one by one or row by row. For example, pixel data are acquired one by one and processed accordingly during the process of operations such as a grayscale conversion operation, a contrast enhancement operation or a binary operation. In operations of Gaussian filtering, extraction of the boundary and extraction of the connected domain, the pixel data are acquired row by row and processed accordingly, and the specific process is described in detail below and is not repeated here again. For example, the image preprocessing operation includes the binary operation, and binary pixel data of a binary image corresponding to the initial image are acquired one by one through the binary operation. For example, this step can convert color RGB images into binary images to extract the connected domain. Because the pixel data are sequentially transmitted one by one or row by row in the transmission process, the image preprocessing operation can be performed on the sequentially transmitted pixel data one by one or row by row to sequentially obtain the binary pixel data of the binary image corresponding to the initial image, so as to realize the real-time processing of the data without operating the cached image frames, thereby avoiding frame caching in the process of processing the captured image. For example, the image preprocessing operation may be performed on one row of the intercept region 102 illustrated in FIG. 3. An exemplary operation method of the image preprocessing operation is illustrated in FIG. 5, and is described in detail below and is not repeated here again.

Step S122: extracting at least one connected domain in the binary image to determine the contour of the predetermined target comprised in the initial image.

For example, based on the binary pixel data obtained in the Step S121, at least one connected domain in the binary image is extracted to determine the contour of the predetermined target comprised in the initial image. For example, in the Step S121, a part of binary pixel data of the binary image corresponding to the initial image are sequentially acquired, the binary pixel data can be read and written in real time to extract the connected domain until all the pixel data are read out, thus realizing the real-time processing of the data in the transmission process of the pixel data. FIG. 8 shows a flow chart of an operation process of a specific example of this step, and the operation process of this specific example will be described in detail below and in not repeated here.

Figure 5:
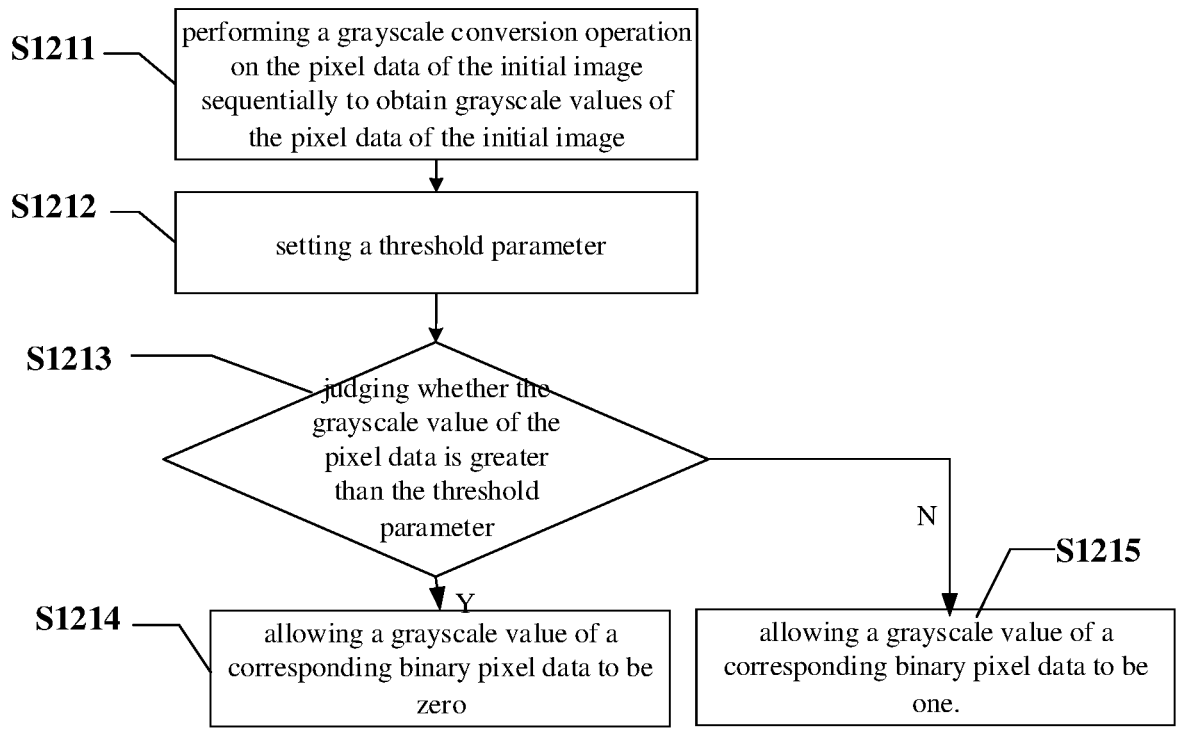
FIG. 5 is a flowchart of an example of step S121 in the image preprocessing operation illustrated in FIG. 4.

For example, FIG. 5 shows a flowchart of the image preprocessing operation provided by an embodiment of the present disclosure. That is, FIG. 5 is an operation flowchart of an image preprocessing method of one example of the step S121 illustrated in FIG. 4. As illustrated in FIG. 5, the image preprocessing operation includes steps S11211 to S1215.

Step S1211: performing a grayscale conversion operation on the pixel data of the initial image sequentially to obtain grayscale values of the pixel data of the initial image.

For example, in the transmission process of the pixel data in a one-by-one manner, the grayscale conversion can be performed on the pixel data one by one. For example, a weighted method, a mean method, a maximum value method, or the like may be used to convert a color image into a grayscale image. For example, a range of the grayscale value of the pixel data is 0-255. It should be noted that an implementation method of the gray conversion (such as the weighting method, the mean value method or the maximum value method, etc.) can be achieved using methods or components in the art, and is not described in detail here again.

For example, the image preprocessing operation may further include performing a contrast enhancement operation on the grayscale value of the pixel data of the initial image, for example, the grayscale value which is higher than a predetermined value may be increased, and the grayscale value which is lower than the predetermined value may be decreased. For example, after the initial image is converted into a grayscale image, in order to better separate the predetermined target (such as a human body) from a background image, a contrast enhancement operation may be performed on the grayscale value of the pixel data of the grayscale image. For example, the contrast enhancement operation can be performed by methods such as histogram equalization, linear transformation, non-linear transformation, and so on. For example, the predetermined value for defining a high grayscale value and a low grayscale value may be selected according to actual conditions. For example, the contrast enhancement operation increases the grayscale value which is higher than the predetermined value and decreases the grayscale value which is lower than the predetermined value. For example, in the transmission process of the pixel data in the one-by-one manner, the contrast enhancement operation may be performed on the pixel data one by one.

For example, in the embodiment of the present disclosure, because the purpose is to better separate the predetermined target (for example, a human body) from the background image, that is, extracting the binary image without image details, the contrast enhancement operation can be realized by a method of linear transformation. This method can be expressed as:

$$g(x)=a*f(x)+b*(1-a)$$

where g(x) represents a grayscale value after the contrast enhancement operation, f(x) represents a grayscale value after the grayscale conversion and before the contrast enhancement operation, a represents a fixed parameter, and b represents an adjustment center grayscale value.

For example, the high grayscale value and the low grayscale value can be divided and a degree of the contrast enhancement can be adjusted by adjusting values of the parameter a and the parameter b in the above formula.

For example, the image preprocessing operation further comprises: sequentially performing a cache operation (rather than a frame cache operation) on the grayscale value of the pixel data of the initial image, or sequentially performing a cache operation (rather than a frame cache operation) on the grayscale value of the pixel data subjected to the contrast enhancement operation, and performing a Gaussian filtering operation on a plurality of rows of grayscale values that are cached. For example, the term "sequentially performing a cache operation" means cache in a row-by-row manner. For example, in the embodiment of the present disclosure, a Gaussian filtering method is adopted to denoise the grayscale image to obtain a smoother image to ensure the accuracy of the image processing result. For example, the Gaussian filtering method adopts a discretized window sliding window convolution method. For example, in the discretized window sliding window convolution method, a 3*3 window template (that is, Gaussian kernel) as illustrated in FIG. 6 is used to traverse the plurality of rows of grayscale values that are cached so as to achieve filtering processing, and after a new row or rows of grayscale values are cached, the new row or rows of grayscale values are scrolled in combination with the existing grayscale values to achieve filtering processing. For example, two lines of grayscale values of the portion of the initial image after the contrast enhancement operation are cached row by row respectively into dual-terminal storage RAM1 and RAM2, and RAM1 is identical to RAM2.

It should be noted that this RAM1 and this RAM2 are respectively similar to the RAM1 and the RAM2 in the four-neighborhood method, and will be described in detail in a step S12211, and is not repeated here. In addition, it should be noted that the traversal method of this Gaussian filtering operation is similar to the traversal method when performing the four-neighborhood method in a step S112212, and the specific traversal process will be described in detail in step S112212 and is not repeated here again.

For example, Gaussian filtering method weights and averages pixels in the neighborhood of pixel data to replace the pixel data to realize smooth filtering of the image using the 3*3 window template (that is, Gaussian kernel). For example, the 3*3 Gaussian template can be obtained by a Gaussian function. For example, the Gaussian function can be expressed as:

$$G(x, y) = e^{\frac{x^2+y^2}{2\sigma^2}},$$

where G(x, y) represents a Gaussian function, $x^2$ and $y^2$ respectively represent a distance between other pixels in the neighborhood and a center pixel in the neighborhood, σ determines a width of the template, and the larger the σ, the smaller the width of the template.

It should be noted that a window template of 5*5 or other sizes may also be used to perform Gaussian filtering on each frame of grayscale image, and the embodiments of the present disclosure are not limited to this case.

It should be noted that filtering methods such as a linear filtering method or a median filtering method may also be used for filtering, and no limitation is imposed to this case in the embodiments of the present disclosure.

For example, in the embodiments of the present disclosure, in the process of transmitting the pixel data of an image one by one, grayscale values of a part of the pixel data of the image after the contrast enhancement operation are cached each time, and Gaussian filtering is sequentially performed on the grayscale values of the part of the pixel data row by row, thereby realizing real-time processing of the data. Because an amount of the grayscale values of the part of the pixel data is only a very small amount, compared with the whole, the real-time processing of the data is not affected, and a resource occupation amount of the data in the image processing process can be reduced. It should be noted that the grayscale values of the cached pixel data may be two rows or a plurality of rows, and the specific number of rows depends on specific situations, and no limitation is imposed to this case in the embodiment of the present disclosure.

Step S1212: setting a threshold parameter.

For example, the threshold parameter can be obtained by a fixed threshold method or a dynamic threshold method. For example, the fixed threshold method is to test a large number of images acquired by the image capture device to determine a fixed threshold, for example, the fixed threshold can be used to effectively identify the predetermined target (for example, the human body). For example, the test includes counting a grayscale distribution of the initial image to determine a grayscale value of the predetermined target (for example, a human body) so as to take the grayscale value as the threshold parameter. For example, the dynamic threshold method can calculate to obtain a histogram of each frame of image to obtain the grayscale distribution of the human body image according to grayscale distribution characteristics in the histogram, thus determining the threshold parameter for dividing the grayscale image into binary images.

For example, the threshold parameter may be stored in a register of a controller (for example, FPGA) for implementing the image processing method of the embodiment of the present disclosure, and can be read from the register by the controller when needed.

Step S1213: judging whether the grayscale value of the pixel data is greater than the threshold parameter, and if so, a step S1214 is execute; if not, a step S1215 is executed.

For example, the grayscale value of the pixel data is compared with the threshold parameter, and in a case where the grayscale value of the pixel data is greater than the threshold parameter, the grayscale value of the corresponding binary pixel data is zero, and in a case where the grayscale value of the pixel data is less than or equal to the threshold parameter, the grayscale value of the corresponding binary pixel data is one. By this step, the grayscale image can be converted into a binary image, thus further reducing the processing amount of data.

Step S1214: allowing the grayscale value of the corresponding binary pixel data to be zero.

Step S1215: allowing the grayscale value of the corresponding binary pixel data to be one.

For example, in an embodiment, the image preprocessing operation further comprises: performing a boundary erosion operation and/or a dilation operation on the pixel data of the binary image. For example, an 1*3 erosion template illustrated in FIG. 7 may be used when etching the boundary of the binary image. For example, the principle of the erosion operation is that if the grayscale value of an i th (i is an integer larger than or equal to 2) pixel data is zero, the grayscale values of an (i−1) th and an (i+1) th pixel data which are adjacent to the i th pixel data are also set to zero, thereby achieving the purpose of filtering, and thus, for example, the boundary of the binary image can be clearer. It should be noted that the erosion operation can also use a 3*3 erosion template to traverse the plurality of binary pixel data that are cached. For example, this traversal process is similar to the traversal process of Gaussian filtering and the traversal process of the four-neighborhood method described in the step S12212, and is not repeated here again. For example, RAM1 and RAM2 similar to those of Gaussian filtering can be used to cache the binary pixel data.

It should be noted that the dilation operation is a reverse operation of the erosion operation, and the principle of the dilation operation is similar to that of the erosion operation, and is not repeated here again.

The boundary of the binary image is filtered by the erosion operation and/or dilation operation (that is, open operation) to make the boundary of the binary image smoother and clearer so as to more accurately extract the boundary of the binary image in subsequent steps, but the embodiment of the present disclosure is not limited to this case.

FIG. 8 is a flowchart of determining the contour of the predetermined target provided by an embodiment of the present disclosure, that is, FIG. 8 is an operation flowchart of an example of the step S122 illustrated in FIG. 4. As illustrated in FIG. 8, the operation includes steps S1221 to S1223.

Step S1221: sequentially extracting boundary pixels in the binary image.

Figures 9, 10, 11:
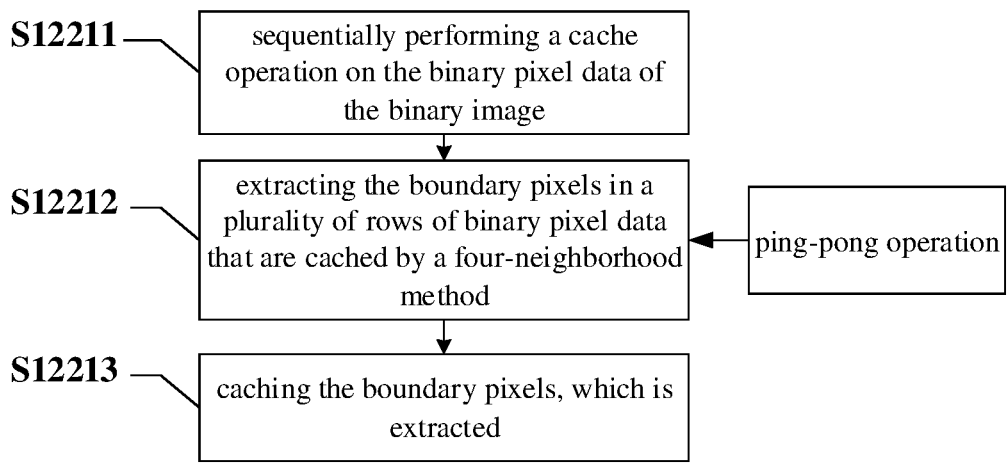
FIG. 9 is a flowchart of an example of step S1221 in the image processing method illustrated in FIG. 8.
FIG. 10 is a schematic diagram of a four-neighborhood method in an image processing method provided by an embodiment of the present disclosure.
FIG. 11 is a schematic diagram of an eight-neighborhood method in an image processing method provided by an embodiment of the present disclosure.

For example, FIG. 9 shows a flowchart of an extraction method of the boundary pixels in the binary image. For example, as illustrated in FIG. 9, the extraction method includes steps S12211 to S12213.

Step S12211: sequentially performing a cache operation on the binary pixel data of the binary image.

For example, in this step, dual-terminal storages RAM1 and RAM2 are used as storages for the cache operation, and RAM1 is identical to RAM2. For example, each of the RAM1 and the RAM2 has two sets of buses, and both the two sets of buses have separate clocks, enable terminals, data buses and read-write address buses. In a case where one terminal of the storage performs a read operation, the other terminal of the storage can simultaneously perform a write operation. For example, the RAM1 stores odd-numbered rows of binary pixel data of the portion of the binary image, for example, a first row is the odd-numbered row, and RAM2 stores even-numbered rows of binary pixel data of the portion of the binary image, for example, a second row is the even-numbered row. For example, in a process of outputting, one by one, the pixel data of the current odd-numbered row (For example, the first row) stored in the RAM1, the pixel data of a next odd-numbered row (For example, a third row) are cached into the RAM1 one by one, and so on. For example, the storage principle of the RAM2 is similar to that of the RAM1 and is not repeated here again. It should be noted that storage content of the RAM1 and storage content of the RAM2 may be interchanged. For example, the RAM1 may store even-numbered rows of binary pixel data of the portion of the binary image, for example, the second row is the even-numbered row, and correspondingly the RAM2 may store odd-numbered rows of binary pixel data of the portion of the binary image, for example, the first row is the odd-numbered row, and no limitation is imposed to this case in the embodiments of the present disclosure.

Step S12212: extracting the boundary pixels in the plurality of rows of binary pixel data that are cached by a four-neighborhood method.

For example, a four-neighborhood method is used to extract the boundary pixels from the data cached in the RAM1 and the RAM2 in the step S12211. For example, a ping-pong operation is used to achieve calculation of the 4-neighborhood method for the plurality rows of binary pixel data in the cache operation. The principle of the ping-pong operation is that the binary pixel data in odd rows are cached in the RAM1, and the binary pixel data in even rows are cached in the RAM2. In a case where the boundary pixels of the pixel data in the odd rows cached in the RAM1 are extracted and output by the four-neighborhood method, the RAM2 does not work (that is, not extracting the boundary pixels). Similarly, in a case where the boundary pixels of the pixel data in the even rows cached in the RAM2 are extracted and output by the four-neighborhood method, the RAM1 does not work, which is just like playing table tennis, there is always one person who does not play the table tennis at a same time. For example, in the step S12211, the RAM1 caches the boundary pixels of the pixel data in a third row of the image data, the RAM2 caches the boundary pixels of the pixel data in a fourth row of the image data, and the boundary pixels of the pixel data in the fourth row can be extracted using the four-neighborhood method in combination with the pixel data in the third row, the fourth row and a fifth row.

For example, three pixel data in the third row stored in RAM1 are read one by one into the first row (for example, a row where number one is located) in a template illustrated in FIG. 10. At the same time, three of the pixel data in the fifth row are written into the RAM1 one by one and simultaneously read into the third row (for example, a row where number 2 is located) in the template illustrated in FIG. 10 from the RAM1 one by one; at the same time, three of the pixel data in the fourth row stored in the RAM2 are read into the second row (for example, a row where number 3 and number 4 are located) in the template illustrated in FIG. 10 one by one. On this basis, the boundary pixel of pixel data now1 in the second row (that is, the fourth row of image data) in the template illustrated in FIG. 10 is extracted with a four-neighborhood method, and so on, until the pixel data of all rows are traversed.

Because the boundary pixels of the pixel data in the current even row (for example, the fourth row) are output upon transmitting the pixel data in the next odd row (for example, the fifth row). Therefore, the method only needs to delay one row in time to output the result, thus realizing the real-time data transmission.

For example, an adjacency relationship among the pixel data in this four-neighborhood method is illustrated in FIG. 10. For example, as illustrated in FIG. 10, judging whether one pixel data now1 is a boundary pixel can be achieved by judging values of binary pixel data in four positions 1, 2, 3, 4 illustrated in FIG. 10. For example, if at least one of the values of the binary pixel data in the four positions 1, 2, 3 and 4 is zero, the current pixel data now1 is a boundary pixel, and the grayscale value of the boundary pixel is set to one and output; and on the contrary, if the values of the binary pixel data in the four positions 1, 2, 3 and 4 are all one, the current pixel data now1 is not a boundary pixel, and the grayscale value of the current pixel data is set to zero and output.

Step S12213: caching the boundary pixels, which is extracted.

For example, the boundary pixels and other pixels extracted in step S12212 are cached into the above-mentioned RAM1 and RAM2 row by row, or two other storages which are same as the above-mentioned RAM1 and RAM2.

Step S1222: classifying the boundary pixels to extract the at least one connected domain.

For example, this step and subsequent steps are performed in a frame blanking phasephase (simply called VBlanking). For example, the frame blanking phase can be generally understood as a time period between two frames of image data during which valid data is not transmitted, that is, an idle interval during the transmission of the pixel data.

For example, an eight-neighborhood method is used to classify the boundary pixels, which is cached, to extract the at least one connected domain. For example, positions of respective pixel data adjacent to the current pixel data in this eight-neighborhood method are illustrated in FIG. 11. For example, boundary pixels sequentially cached into the RAM1 and the RAM2 in the step S12213 are read according to addresses. For example, a boundary pixel is found first and recorded as a first pixel data, for example, the first pixel data is a current pixel now2 illustrated in FIG. 11. Then, values of pixel data in eight positions 1, 2, 3, 4, 5, 6, 7, 8 that are adjacent to the first pixel data now2 are sequentially judged. If it is sequentially judged to a certain position, the value of the pixel data (for example, a position 2 illustrated in FIG. 11) of which is one, of the eight positions, then it jumps to the position (for example, the position 2 illustrated in FIG. 11) and a grayscale value of the first pixel data now2 is set to zero. For example, the pixel data of the position 2 illustrated in FIG. 11 is another boundary pixel. For example, after jumping to this position (for example, the position 2 illustrated in FIG. 11), the above judgement of the pixel data is continued through the eight-neighborhood method until the position of the first pixel data now2 is judged, thus extracting the connected domain in the boundary image. For example, after one connected domain is determined, determination of a next connected domain is continued with the sequential transmission of pixel data until all connected domains are determined. For example, in the process of determining the connected domain, coordinates of all the boundary pixels of the connected domain are stored in a storage.

For example, the coordinates of all the boundary pixels can be obtained by a counter of a controller (for example, FPGA) for achieving the image processing method of the embodiment of the present disclosure. For example, in the step S110, the controller acquices all the pixel data (including the boundary pixels) in the intercept region by counting the field synchronization control signal and the clock signal. In the counting process, for example, the clock signal is a horizontal (row) coordinate of the pixel data in the intercept region, and the field synchronization control signal is, for example, a vertical (column) coordinate of the pixel data in the intercept region. Therefore, the horizontal coordinate and the vertical coordinate ordinate of the boundary pixel are obtained by counting the number of the clock signals and the field synchronization control signals of the boundary pixel in the step S110.

For example, the connected domain extracted in this step includes a human body region and a background region. For example, in this embodiment, the background region is a noise region.

It should be noted that the cache operation and the ping-pong operation in a case where the eight-neighborhood method is adopted in this step are similar to those in the step S112212, and RAM1 and RAM2 adopted in this step can reuse the RAM1 and the RAM2 in the Gaussian filtering process or the step S12211, which is not be repeated here again.

Step S1223: determining a largest connected domain to obtain the contour of the predetermined target comprised in the initial image.

For example, the connected domain with a largest number of coordinates of boundary pixels is determined as the largest connected domain. For example, the largest connected domain is the contour of the predetermined target (for example, the human body) comprised in the initial image. For example, the largest connected domain is determined according to the at least one connected domain acquired in the step S1222 to obtain the contour of the predetermined target comprised in the initial image. For example, the RAM1 and the RAM2 in the step S12211 can be used again to respectively store coordinates of boundary pixels of two connected domains. For example, the number of coordinates in the storage is counted and compared in a case where the coordinates of the boundary pixels of the connected domain are written into the corresponding storage.

For example, first, coordinates of boundary pixels of a first connected domain are extracted and stored in RAM 1; and then coordinates of boundary pixels of a second connected domain are extracted and stored in RAM2, and the number of the coordinates stored in the RAM2 is compared with the number of the coordinates stored in the RAM1. For example, the storage in which the number of the coordinates of the boundary pixels of the connected domain is smaller is emptied, and data in the storage in which the number of the coordinates of the boundary pixels of the connected domain is larger is retained. Coordinates of boundary pixels of a third connected domain are continuously extracted and stored in the previously emptied storage, and then the number of the coordinates stored in the third connected domain is compared with the number of the coordinates of the boundary pixels of the connected domain in the previously retained storage until all the coordinates of all the connected domains of the whole frame of image are extracted and compared, and the number of the coordinates of the boundary pixels of the connected domain stored in the finally reserved storage is the largest, and the connected domain with the largest number of the coordinates of the boundary pixels is the largest connected domain. For example, in this embodiment, the connected domain with a smaller number of coordinates is the background region (that is, the noise region).

Figure 12:
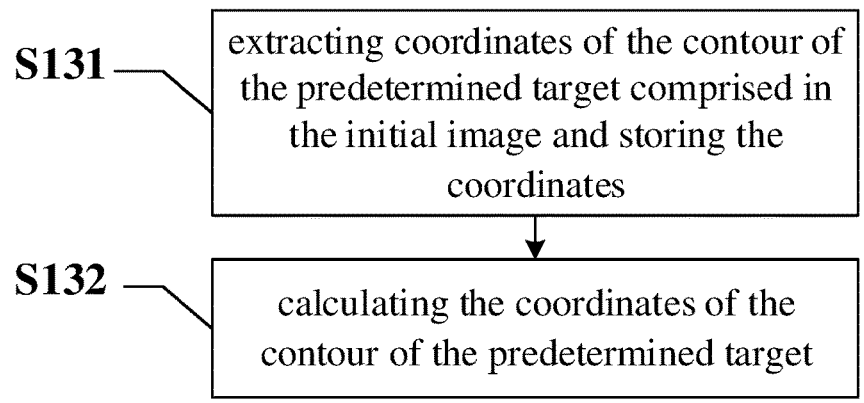
FIG. 12 is a flowchart of an example of step S130 in the image processing method illustrated in FIG. 2.

FIG. 12 shows a flowchart of a solution method for obtaining information of the predetermined target. That is, FIG. 12 is a flowchart of of an example of the step S130 in the image processing method illustrated in FIG. 2. As illustrated in FIG. 12, the solution method includes a step S131 and a step S132. For example, the solution method for obtaining the information of the predetermined target is also performed in the frame blanking phase.

Step S131: extracting coordinates of the contour of the predetermined target comprised in the initial image and storing the coordinates.

For example, the coordinates of the contour of the predetermined target (that is, the human body) in the embodiment of the present disclosure are the coordinates of the largest connected domain determined in the step S1223. For example, the coordinates of the contour of the human body are stored in a storage. For example, the storage may also use the RAM1 or the RAM2 that are used in the above step S12211.

Step S132: calculating the coordinates of the contour of the predetermined target.

For example, the coordinates of the contour of the predetermined target are calculated to obtain the information of the predetermined target (that is, the human body). For example, the information of the predetermined target (that is, the human body) includes height, waist circumference or chest circumference, etc.

For example, the information of the predetermined target (that is, the human body) is calculated and obtained by controlling reading and writing of the coordinates of the contour of the predetermined target (that is, the human body) in the frame blanking phase and by calculating the coordinates. For example, various parameters such as a proportion of the human body are stored in advance in the register of a controller (for example, FPGA) of the system for judging specific positions of various parts of the human body such as the head or the waist.

The method of obtaining the information of the human body is described by taking a calculation of the waist circumference as an example in the following. For example, a specific position of the waist in the contour of the human body is determined by the proportion of the human body, two coordinates respectively at a left side and a right side of the waist position in the contour of the human body are extracted according to the specific position, and the waist circumference of the human body is roughly obtained by performing a a subtraction operation between the two coordinates.

It should be noted that the calculation of the various parameters in the human body is not limited to this case, and other methods in the field can also be used for the calculation, and the embodiments of the present disclosure are not limited to this case. In addition, it should be noted that the calculation of other parameters is similar to the calculation of the waist circumference and is not repeated here again.

For example, the parameters, which is calculated, of the human body are uploaded to a controller of the system, such as a CPU, so that the controller controls the display to display clothes suitable for the customer's size and style according to the parameters.

Figure 13:
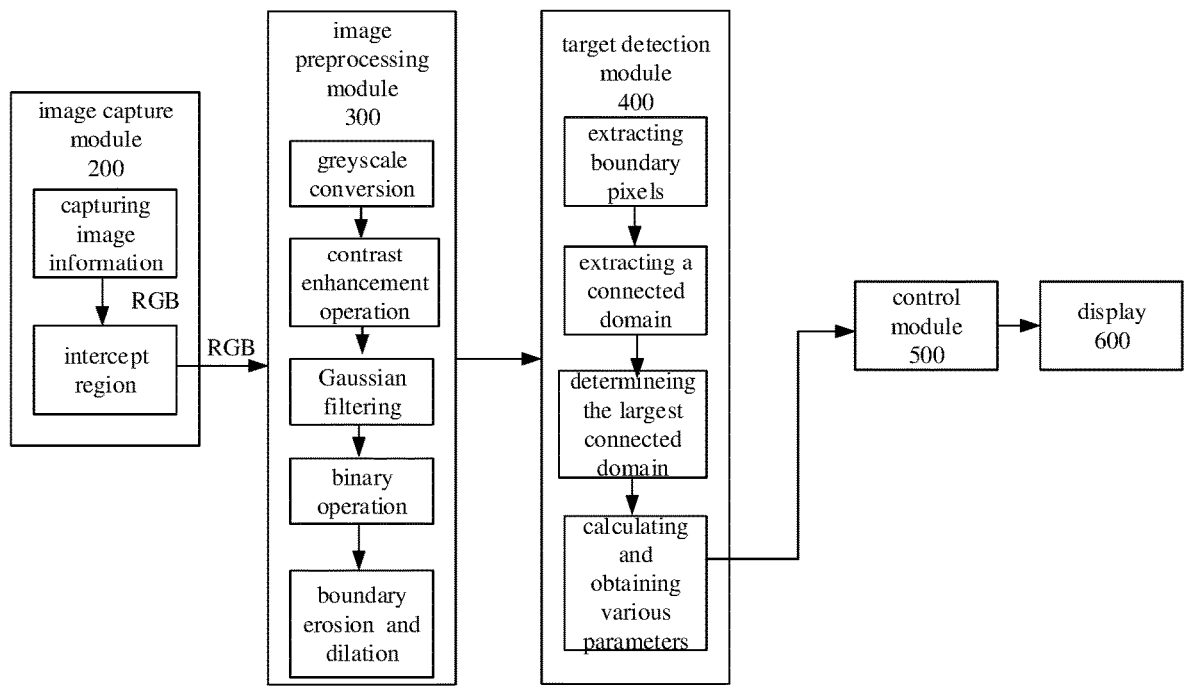
FIG. 13 is a schematic block diagram of an image processing system provided by an embodiment of the disclosure.

FIG. 13 shows a schematic diagram of an image processing system provided by an embodiment of the present disclosure. Referring to FIG. 13, the image processing system of the embodiment of the present disclosure includes an image capture module 200, an image preprocessing module 300, an object detection module 400, a control module 500, and a display 600. For example, the image processing system can be applied to a smart fitting mirror.

For example, the image capture module 200 may achieve the step S110 illustrated in FIG. 2. For example, the image capture module 200 may capture image information to obtain an initial image and intercept a portion, corresponding to the intercept region, of the initial image. For example, the portion, corresponding to the intercept region, of the initial image, is transmitted to the image preprocessing module 300 for the image preprocessing operation. For example, images in the image capture module 200 are all color images, and of course, they may also be black-and-white images.

For example, the image preprocessing module 300 operates in the transmission process of the pixel data. For example, the image preprocessing module 300 may achieve the step S121 illustrated in FIG. 4. For example, the image preprocessing module 300 sequentially performs the greyscale conversion operation on the pixel data, which are transmitted one by one from the image capture module 200, of the portion, which is a color image, corresponding to the intercept region, of the initial image, so that the pixel data are converted into a grayscale image, and the image preprocessing module 300 performs the contrast enhancement operation on the pixel data of the gray image one by one to better separate the predetermined target (for example, a human body) from a background, and performs the Gaussian filtering, row by row, on the pixel data of the gray image subjected to the contrast enhancement operation to denoise the grayscale image to obtain more accurate information of the contour. For example, a binary operation (for example, threshold segmentation) is performed, one by one, on the images subjected to the Gaussian filtering to convert the grayscale images into binary images, thereby reducing the processing amount of data. For example, the image preprocessing module 300 also performs the boundary erosion operation and the dilation operation on the binary images row by row, so as to facilitate the target detection module 400 to extract the boundary pixels.

For example, the target detection module 400 may achieve the step S122 illustrated in FIG. 4. For example, the target detection module 400 extracts the boundary pixels row by row from the binary pixel data transmitted from the image preprocessing module 300 by the four-neighborhood method, and processes the boundary pixels by the eight-neighborhood method to extract all the connected domains. For example, the boundary extraction process in the target detection module 400 is performed in the transmission process of the pixel data, and the connected domain extraction process is performed in the frame blanking phase, that is, a time period between two frames of image data during which valid data is not transmitted, that is, an idle interval in the transmission process of the pixel data. For example, the target detection module 400 determines the largest connected domain by comparing the number of the coordinates of the boundary pixels of each connected domain, and the largest connected domain is the contour of the predetermined target. For example, each parameter of the predetermined target is obtained by calculating the coordinates of the contour of the predetermined target (that is, the boundary pixels of the largest connected domain). For example, in the case where the predetermined target is the human body, the parameters may include height, waist circumference or chest circumference, etc. The target detection module 400 transmits the parameters, which has been obtained, to the control module 500.

For example, the control module 500 (for example, CPU) recommends suitable clothes for the customer and display it on the display 600 according to the various parameters, and can also display it in combination with other image frames cached by the frame cache unit, so that the customer can see the wearing effect without actually trying on the clothes, thus enabling the customer to obtain a better fitting experience.

For example, the display 600 may be an OLED display screen, a liquid crystal display (LCD), or the like, and no limitation is imposed to this case in the embodiments of the present disclosure.

Because the boundary extraction process performed in the above-mentioned image preprocessing module 300 and the target detection module 400 is realized in the transmission process of the pixel data, and the extraction of the connected domain and the calculation of the coordinates in the target detection module 400 are realized in the frame blanking phase, the image processing system can process the acquired video or image in real time without frame cache, thus reducing the operation power consumption and the manufacturing cost of the device, improving the response speed of the device, and thus enabling customers to obtain better use experiences.

It should be noted that the above modules can be implemented by software, firmware, hardware (for example, FPGA) or any combination thereof.

It should be noted that in the embodiment of the present disclosure, the flow for the image processing method may include more or less operations which may be performed sequentially or in parallel. Although the flow of the image processing method described above includes a plurality of operations performed in a specific order, it should be clearly understood that the order of the plurality of operations is not limited. The image processing method described above may be performed once or multiple times according to predetermined conditions.

At least one embodiment of the present disclosure further provides an image processing system 1 configured to execute the above image processing method provided by the embodiments of the present disclosure. For example, the image processing system 1 may be implemented by software, firmware, hardware, or any combination thereof.

Figure 14:
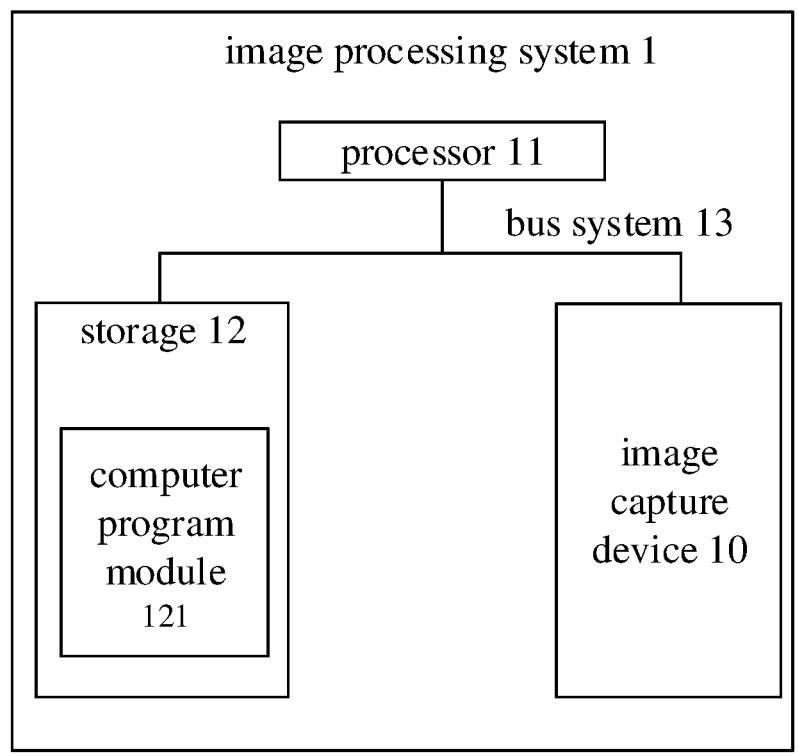
FIG. 14 is a schematic diagram of an image processing system provided by an embodiment of the present disclosure.

FIG. 14 is a schematic block diagram of an exemplary image processing system 1 provided by an embodiment of the disclosure. For example, the image processing system 1 illustrated in FIG. 14 may include an image capture device 10, a processor 11, a storage 12, and one or more computer program modules 121.

For example, the image capture device 10 is configured to acquire an initial image. For example, the image capture device 10 may be a CMOS (Complementary Metal Oxide Semiconductor) sensor, a CCD (Charge Coupled Device) sensor, or the like.

For example, the processor 11 and the storage 12 are connected through a bus system 13. For example, one or more computer program modules 121 may be stored in the storage 12. For example, one or more computer program modules 121 may include instructions for executing the image processing method described above. For example, instructions in one or more computer program modules 121 may be executed by the processor 11. For example, the bus system 13 may be a common serial or parallel communication bus, and the embodiments of the present disclosure are not limited thereto.

For example, the processor 11 may be a central processing unit (CPU) or other form of processing unit having a data processing capability and/or an instruction execution capability, may be a general purpose processor or a special purpose processor, and may control other components in the image processing system 1 to perform desired functions. Storage 12 may include one or more computer program products that may include various forms of computer-readable storage mediums, such as volatile storage and/or non-volatile storage. The volatile storage may include, for example, random access storage (RAM) and/or cache, etc. The nonvolatile storage may include, for example, read only storage (ROM), hard disk, flash storage, etc. One or more computer program instructions may be stored in the computer-readable storage medium, and the processor 11 may execute the program instructions to realize the functions (achieved by the processor 11) in the embodiments of the present disclosure and/or other desired functions, such as image processing methods, etc. The computer-readable storage medium may also store various application programs and various data, such as threshold parameters and various data used and/or generated by application programs.

It should be noted that not all components of the image processing system 1 are given for clarity. In order to realize the necessary functions of the image processing system 1, those skilled in the art can improve and set other components not illustrated according to specific needs, and no limitation is imposed to this case in the present disclosure.

The technical effect of the image processing system 1 may refer to the technical effect of the image processing method provided in the embodiment of the present disclosure and is not described here again.

At least one embodiment of the present disclosure further provides a storage medium. For example, the storage medium is used for non-temporarily storing computer readable instructions, and in a case where the computer readable instructions are executed by a computer (including a processor), the storage medium can perform the image processing method provided by any one of the embodiments of the present disclosure.

For example, the storage medium may be any combination of one or more computer-readable storage mediums, for example, one computer-readable storage medium includes computer-readable program code for performing the image preprocessing operation, and another computer-readable storage medium includes computer-readable program code for performing the extraction operation of the connected domains. For example, in a case where the program code is read by a computer, the computer may execute the program code stored in the computer storage medium, and perform operation methods such as the image preprocessing operation, the extraction operation of the connected domains, the image processing, and the like, which are provided by any one of the embodiments of the present disclosure.

For example, the storage medium may include a storage card of a smart phone, a storage component of a tablet computer, a hard disk of a personal computer, a random access storage (RAM), a read only storage (ROM), an erasable programmable read-only storage (EPROM), a portable compact disk read only storage (CD-ROM), a flash storage, or any combination of the above storage mediums, or other suitable storage mediums.

The following points need to be explained:

(1) The drawings of the embodiments of the present disclosure only refer to the structures related to the embodiments of the present disclosure, and other structures may refer to the general design.

(2) Without conflict, the embodiments of the present disclosure and the features in the embodiments can be combined with each other to obtain new embodiments.

What have been described above are only specific implementations of the present disclosure, the protection scope of the present disclosure is not limited thereto. The protection scope of the present disclosure should be based on the protection scope of the claims.

What is claimed is:

1. An image processing method, comprising:
acquiring an initial image;
extracting a contour of a predetermined target comprised in the initial image during a transmission process of transmitting pixel data of the initial image one by one or row by row; and
obtaining information of the predetermined target according to the contour of the predetermined target comprised in the initial image,
wherein extracting the contour of the predetermined target comprised in the initial image comprises:
performing an image preprocessing operation on the pixel data of the initial image sequentially acquired in the transmission process to sequentially obtain binary pixel data of a binary image corresponding to the initial image; and
extracting at least one connected domain in the binary image based on the binary pixel data, which has been obtained, to determine the contour of the predetermined target comprised in the initial image.

2. The image processing method according to claim 1, wherein the image preprocessing operation comprises:
sequentially performing a grayscale conversion operation on the pixel data of the initial image to obtain grayscale values of the pixel data of the initial image; and
comparing the grayscale values of the pixel data with a threshold parameter, and in a case where a grayscale value of one of the pixel data is greater than the threshold parameter, a grayscale value of a corresponding binary pixel data is zero, and in a case where a grayscale value of one of the pixel data is less than or equal to the threshold parameter, a grayscale value of a corresponding binary pixel data is one.

3. The image processing method according to claim 2, wherein the image preprocessing operation further comprises:
performing a contrast enhancement operation on the grayscale values of the pixel data of the initial image.

4. The image processing method according to claim 2, wherein the image preprocessing operation further comprises:

sequentially performing a cache operation on the grayscale values of the pixel data of the initial image, or sequentially performing a cache operation on the grayscale values of the pixel data subjected to the contrast enhancement operation; and performing a Gaussian filtering operation on a plurality of rows of grayscale values that are cached.

5. The image processing method according to claim 2, wherein the threshold parameter is acquired by a fixed threshold method or a dynamic threshold method.

6. The image processing method according to claim 2, wherein the image preprocessing operation further comprises:

performing a boundary erosion operation and/or a dilation operation on the pixel data of the binary image.

7. An image processing method, comprising:

acquiring an initial image;

extracting a contour of a predetermined target comprised in the initial image during a transmission process of transmitting pixel data of the initial image one by one or row by row; and obtaining information of the predetermined target according to the contour of the predetermined target comprised in the initial image, wherein extracting the contour of the predetermined target comprised in the initial image comprises:

performing an image preprocessing operation on the pixel data of the initial image sequentially acquired in the transmission process to sequentially obtain binary pixel data of a binary image corresponding to the initial image; and extracting at least one connected domain in the binary image based on the binary pixel data, which has been obtained, to determine the contour of the predetermined target comprised in the initial image, wherein extracting at least one connected domain in the binary image based on the binary pixel data, which has been obtained, to determine the contour of the predetermined target comprised in the initial image, comprises:

sequentially extracting boundary pixels in the binary image;

classifying the boundary pixels to extract the at least one connected domain; and determining a largest connected domain according to the at least one connected domain to obtain the contour of the predetermined target comprised in the initial image.

8. The image processing method according to claim 7, wherein sequentially extracting the boundary pixels in the binary image comprises:

sequentially performing a cache operation on the binary pixel data of the binary image; and extracting the boundary pixels in a plurality of rows of binary pixel data, which are cached, by a four-neighborhood method, and caching the boundary pixels, which is extracted.

9. The image processing method according to claim 8, wherein sequentially extracting the boundary pixels in the binary image further comprises:

performing a calculation of the four-neighborhood method on the plurality of rows of binary pixel data that are cached, by a ping-pong operation.

10. The image processing method according to claim 7, wherein classifying the boundary pixels to extract the at least one connected domain comprises:

classifying the boundary pixels to extract the at least one connected domain by an eight-neighborhood method.

11. The image processing method according to claim 7, wherein determining the largest connected domain according to the at least one connected domain to obtain the contour of the predetermined target comprised in the initial image comprises:

determining the connected domain with a largest number of coordinates of the boundary pixels as the largest connected domain, wherein the largest connected domain is the contour of the predetermined target comprised in the initial image.

12. The image processing method according to claim 1, wherein obtaining the information of the predetermined target according to the contour of the predetermined target comprised in the initial image comprises:

extracting coordinates of the contour of the predetermined target comprised in the initial image and storing the coordinates; and calculating the coordinates of the contour of the predetermined target to obtain the information of the predetermined target.

13. The image processing method according to claim 1, further comprising:

before the initial image is acquired, acquiring an intercept parameter of an intercept region, and only acquiring a portion of the initial image corresponding to the intercept region from an image capture device based on the intercept parameter, so as to process the portion of the initial image.

14. The image processing method according to claim 13, wherein the intercept parameter comprises data, which is to be retained upon counting based on a field synchronization control signal and/or a clock signal of the image capture device, of the initial image.

15. The image processing method according to claim 1, wherein the predetermined target is a human body.

16. The image processing method according to claim 7, wherein classifying the boundary pixels to extract the at least one connected domain and obtaining the information of the predetermined target according to the contour of the predetermined target comprised in the initial image are performed in blanking phase of a frame.

17. An image processing system, comprising:

a processor;

a storage; and one or more computer program modules stored in the storage and configured to be executed by the processor, wherein the one or more computer program modules comprise instructions for executing an image processing method, wherein the image processing method comprises:

acquiring an initial image;

extracting a contour of a predetermined target comprised in the initial image during a transmission process of transmitting pixel data of the initial image one by one or row by row; and obtaining information of the predetermined target according to the contour of the predetermined target comprised in the initial image, wherein extracting the contour of the predetermined target comprised in the initial image comprises:

performing an image preprocessing operation on the pixel data of the initial image sequentially acquired in the transmission process to sequentially obtain binary pixel data of a binary image corresponding to the initial image; and extracting at least one connected domain in the binary image based on the binary pixel data, which has been obtained, to determine the contour of the predetermined target comprised in the initial image.

18. The image processing system according to claim 17, further comprising an image capture device, wherein the image capture device is configured to acquire the initial image.

19. A non-transitory storage medium, non-temporarily storing computer readable instructions, wherein in a case where the computer readable instructions, which is stored non-temporarily, are executed by a computer, the storage medium performs the image processing method according to claim 1,
   wherein the image processing method comprises:
   acquiring an initial image;
   extracting a contour of a predetermined target comprised in the initial image during a transmission process of transmitting pixel data of the initial image one by one or row by row; and obtaining information of the predetermined target according to the contour of the predetermined target comprised in the initial image, wherein extracting the contour of the predetermined target comprised in the initial image comprises:

performing an image preprocessing operation on the pixel data of the initial image sequentially acquired in the transmission process to sequentially obtain binary pixel data of a binary image corresponding to the initial image; and extracting at least one connected domain in the binary image based on the binary pixel data, which has been obtained, to determine the contour of the predetermined target comprised in the initial image.

\* \* \* \* \*